United States Patent
Chen et al.

(10) Patent No.: US 10,488,923 B1
(45) Date of Patent: Nov. 26, 2019

(54) GAZE DETECTION, IDENTIFICATION AND CONTROL METHOD

(71) Applicant: Compal Electronics, Inc., Taipei (TW)

(72) Inventors: Huang-Chih Chen, Taipei (TW); Yueh-Hsiang Chen, Taipei (TW); Yu-Cheng Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/543,068

(22) Filed: Aug. 16, 2019

Related U.S. Application Data

(62) Division of application No. 16/359,238, filed on Mar. 20, 2019, which is a division of application No. 15/840,945, filed on Dec. 13, 2017, now abandoned.

(30) Foreign Application Priority Data

Sep. 25, 2017 (TW) .............................. 106132857 A

(51) Int. Cl.
*G06F 3/01* (2006.01)
*G06K 9/00* (2006.01)

(52) U.S. Cl.
CPC ........... *G06F 3/013* (2013.01); *G06K 9/0061* (2013.01); *G06K 9/00604* (2013.01); *G06K 9/00617* (2013.01)

(58) Field of Classification Search
CPC ........................................................
G06F 3/013; G06K 9/00617; G06K 9/00604; G06K 9/0061
See application file for complete search history.

(56) References Cited

U.S. PATENT DOCUMENTS

| | | | |
|---|---|---|---|
| 6,659,611 B2 * | 12/2003 | Amir ..................... | A61B 3/113 351/210 |
| 2003/0223037 A1 * | 12/2003 | Chernyak ............ | A61B 3/1015 351/209 |
| 2009/0109400 A1 * | 4/2009 | Yoshinaga ............. | A61B 3/113 351/210 |
| 2010/0231504 A1 | 9/2010 | Bloem et al. | |
| 2011/0164816 A1 * | 7/2011 | Guo .................. | G06K 9/00241 382/165 |
| 2011/0187845 A1 * | 8/2011 | Bazakos ............ | G06K 9/00261 348/78 |

(Continued)

FOREIGN PATENT DOCUMENTS

| | | |
|---|---|---|
| CN | 104391572 A | 3/2015 |
| TW | 201624200 A | 7/2016 |
| TW | 201711630 A | 4/2017 |

*Primary Examiner* — Abhishek Sarma
(74) *Attorney, Agent, or Firm* — Kirton McConkie; Evan R. Witt

(57) ABSTRACT

A gaze detection, identification and control method includes steps of providing a portable electronic device, performing a continuous image capture on a user through an image capture unit of the portable electronic device to sequentially obtain an initial image and a plurality of detected images, detecting and defining a gaze position of the user according to the initial image, identifying a change amount and a change direction of the gaze position of the user according to the detected images, and sending a control command according to the change amount and the change direction. Therefore, the advantages of easy recognition and time-saving are achieved.

5 Claims, 8 Drawing Sheets

(56) References Cited

U.S. PATENT DOCUMENTS

| | | | |
|---|---|---|---|
| 2013/0336547 A1* | 12/2013 | Komogortsev | A61B 5/1171 |
| | | | 382/117 |
| 2014/0204193 A1* | 7/2014 | Zhang | G06K 9/00597 |
| | | | 348/78 |
| 2014/0211995 A1* | 7/2014 | Model | G06F 3/013 |
| | | | 382/103 |
| 2015/0293588 A1* | 10/2015 | Strupczewski | G06T 17/10 |
| | | | 382/117 |
| 2018/0189563 A1* | 7/2018 | Palzer | A61B 3/107 |

* cited by examiner

GAZE DETECTION, IDENTIFICATION AND CONTROL METHOD

CROSS-REFERENCE TO RELATED APPLICATION

This application is a Divisional Application of U.S. patent application Ser. No. 16/359,238 filed on Mar. 20, 2019 and entitled "GAZE DETECTION, IDENTIFICATION AND CONTROL METHOD", which is a Divisional Application of U.S. patent application Ser. No. 15/840,945 filed on Dec. 13, 2017 that claims priority to Taiwan Patent Application No. 106132857 filed on Sep. 25, 2017, the entirety of which is hereby incorporated by reference.

FIELD OF THE INVENTION

The present invention relates to an identification and detection method, and more particularly to a gaze detection, identification and control method implemented by recording and tracing eyeballs and head shape.

BACKGROUND OF THE INVENTION

In the common smartphones and tablet PCs, which are the most popular on the market, most applications are controlled through the touch of hand as a control command input. Although the smartphones and the tablet PCs equipped with large screens are good for reading, it is difficult and inconvenient for the normal user to operate with merely one hand.

For example, when shooting with a camera on a smartphone or a tablet PC, to change the focus depth, the same scene must be shot through two lenses and different focusing must be performed in the process. Finally, the smartphone or the tablet PC is manually clicked to make images with short focal length or long focal length clear. However, in a situation only one hand of the user is available for operation, it is very inconvenient for the user to hold the smartphone or the tablet PC and adjust the focal length or push the photographing button at the same time. In addition, when browsing web pages, articles, letters, maps and photos, the user must constantly slide the hand on the display to scroll the display for reading. However, with only one hand operation, it is difficult for the user to simultaneously hold the hand-held smartphone or tablet PC while sliding on the display. In short, current smartphones and tablet PCs are not friendly enough to operate with one hand. It is difficult for the user to operate with only one hand. Therefore, after investigation, research and development, a manner of control through eyeballs of human is put forward.

In the prior art, the conventional technique of control through eyeballs of human usually sets two coordinates, one is the coordinate of the eyeball, and the other is the coordinate of the cursor on the display. By capturing the coordinate positions of the pupil through the camera before and after the movement, the distance of the movement is enlarged and corresponded to the coordinates on the display. However, since the pupil occupies a zone of low-proportion of the eye, a precise correction method must be applied, and re-corrections are required for different users. It not only causes problems of recognition, but also causes waste of time and other invisible costs.

Therefore, there is a need of providing a gaze detection, identification and control method distinct from the prior art in order to solve the above drawbacks, achieve precise recognition and implement diverse functions.

SUMMARY OF THE INVENTION

Some embodiments of the present invention are to provide a gaze detection, identification and control method in order to overcome at least one of the above-mentioned drawbacks encountered by the prior arts.

The present invention provides a gaze detection, identification and control method. By continuously detecting and identifying the gazing position of the user for sending the control command, the gaze control method of controlling the portable electronic device is effectively provided. Meanwhile, since the identification of the change amount and the change direction of the gaze position of different users may be implemented without high-precision corrections, the advantages of easy recognition and time-saving are achieved.

In accordance with an aspect of the present invention, there is provided a gaze detection, identification and control method. The gaze detection, identification and control method includes steps of providing a portable electronic device, performing a continuous image capture on a user through an image capture unit of the portable electronic device to sequentially obtain an initial image and a plurality of detected images, detecting and defining a gaze position of the user according to the initial image, identifying a change amount and a change direction of the gaze position of the user according to the detected images, and sending a control command according to the change amount and the change direction The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
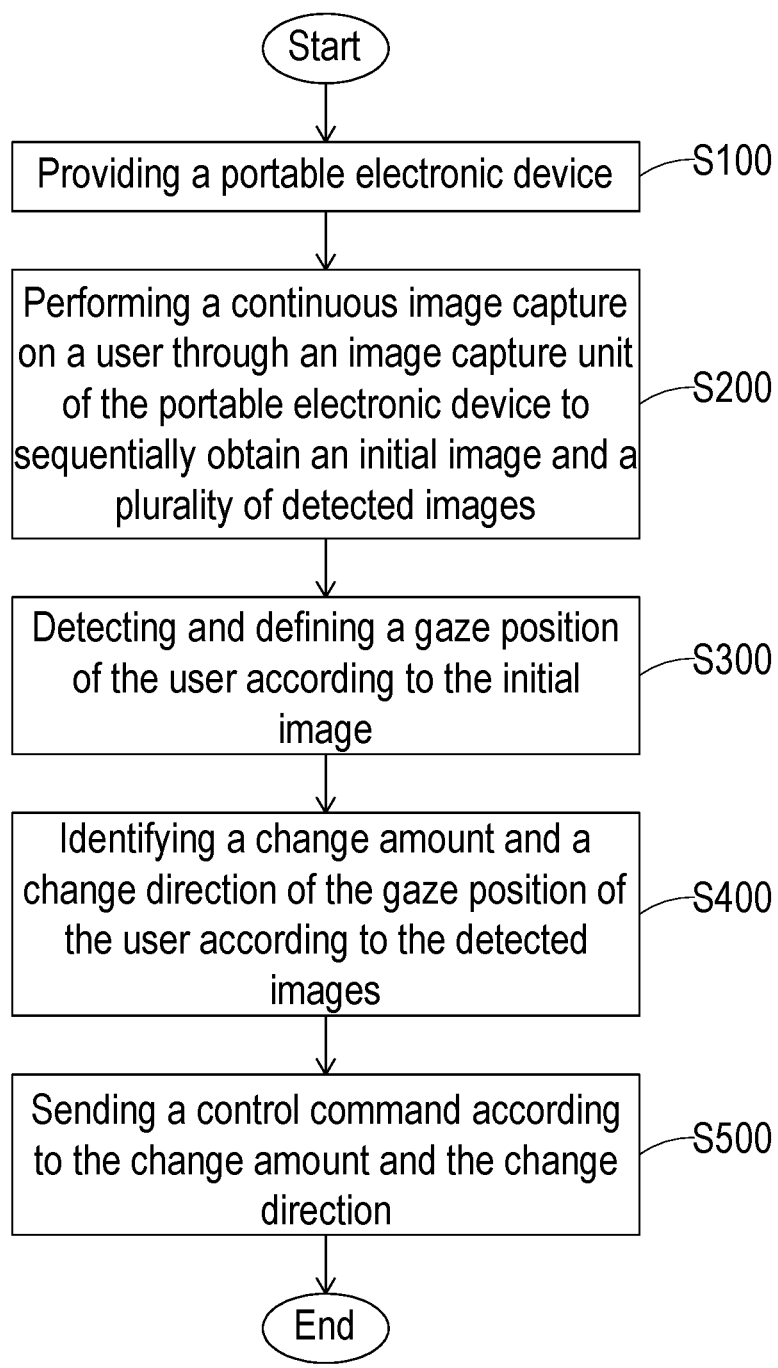
FIG. 1 schematically illustrates the flow chart of a gaze detection, identification and control method according to an embodiment of the present invention.

Please refer to FIG. 1. FIG. 1 schematically illustrates the flow chart of a gaze detection, identification and control method according to an embodiment of the present invention. As shown in FIG. 1, an embodiment of a gaze detection, identification and control method includes steps as following. First of all, as shown in step S100, providing a portable electronic device, in which the portable electronic device may be a smartphone or a tablet PC, but not limited herein. Next, as shown in step S200, performing a continuous image capture on a user through an image capture unit of the portable electronic device to sequentially obtain an initial image and a plurality of detected images. Then, as shown in step S300, detecting and defining a gaze position of the user according to the initial image. Next, as shown in step S400, identifying a change amount and a change direction of the gaze position of the user according to the detected images. Next, as shown in step S500, sending a control command according to the change amount and the change direction. The control command is directly sent to a main processor of the portable electronic device, so that an application is executed, or a specified function of the portable electronic device is started. Therefore, the gaze control method of controlling the portable electronic device is effectively provided. Meanwhile, since the identification of the change amount and the change direction of the gaze position of different users may be implemented without corrections of high precision, the advantages of easy recognition and time-saving are achieved.

Figure 2:
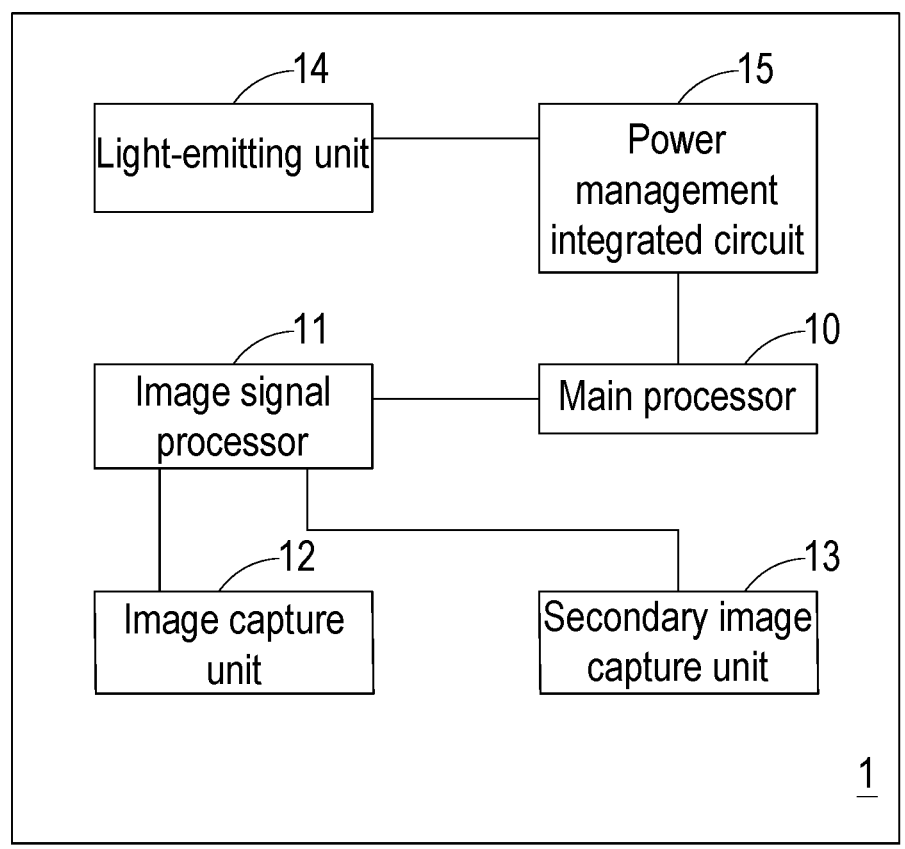
FIG. 2 schematically illustrates the configuration of a portable electronic device applied to the gaze detection, identification and control method of the present invention.

Please refer to FIG. 2. FIG. 2 schematically illustrates the configuration of a portable electronic device applied to the gaze detection, identification and control method of the present invention. As shown in FIG. 2, a portable electronic device 1 applied to the gaze detection, identification and control method of the present invention includes a main processor 10, an image signal processor (ISP) 11, an image capture unit 12, a secondary image capture unit 13, a light-emitting unit 14 and a power management integrated circuit (PMIC) 15. In some embodiments, the main processor 10 may be a central processing unit, a microprocessor or a microcontroller, but not limited herein. The image signal processor 11 is connected with the main processor 10 or integrated within the main processor 10 for processing the captured images and then providing to the main processor 10. The image capture unit 12 and the secondary image capture unit 13 are connected with the image signal processor 11 for capturing the initial images and the detected images mentioned in the above embodiments, but not limited herein. The light-emitting unit 14 is for example a light-emitting diode (LED), but not limited herein. The light-emitting unit may be utilized as a flash light or a compensation light. The power management integrated circuit 15 is connected with the light-emitting unit 14 and the main processor 10. The power management integrated circuit 15 is controlled by the main processor 10 to provide power to the light-emitting unit 14, so that the light-emitting unit 14 may perform a flash or a light compensation to meet the practical demands.

Please refer to FIG. 1 and FIG. 2 again. In some embodiments, the portable electronic device 1 may include only the image capture unit 12 or include the image capture unit 12 and the secondary image capture unit 13 simultaneously (e.g. image capture units having different focus depths or different focal lengths). The step S200 of the above-mentioned embodiments is preferably implemented by the image capture unit 12 or is implemented by the image capture unit 12 and the secondary image capture unit 13, but not limited thereto.

Figure 3:
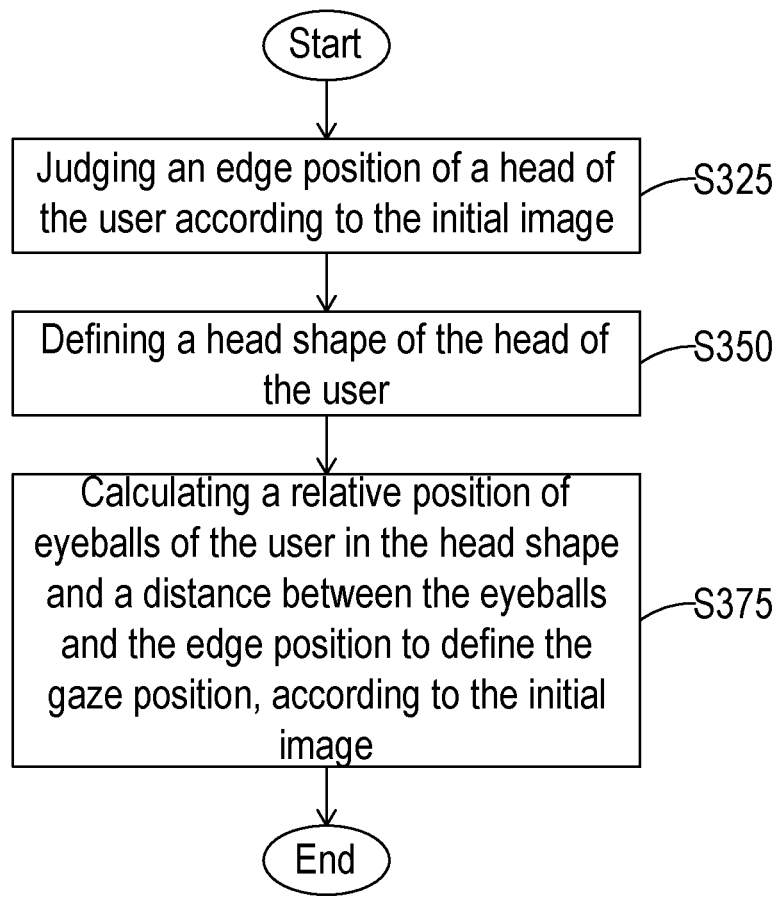
FIG. 3 schematically illustrates the detailed flow chart of a gaze detection, identification and control method according to an embodiment of the present invention.
Figure 4A:
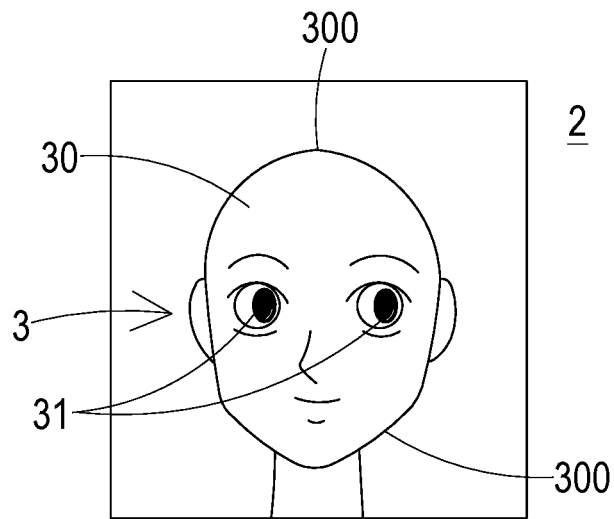
FIG. 4A schematically illustrates the initial image captured through the gaze detection, identification and control method of the present invention.
Figure 4B:
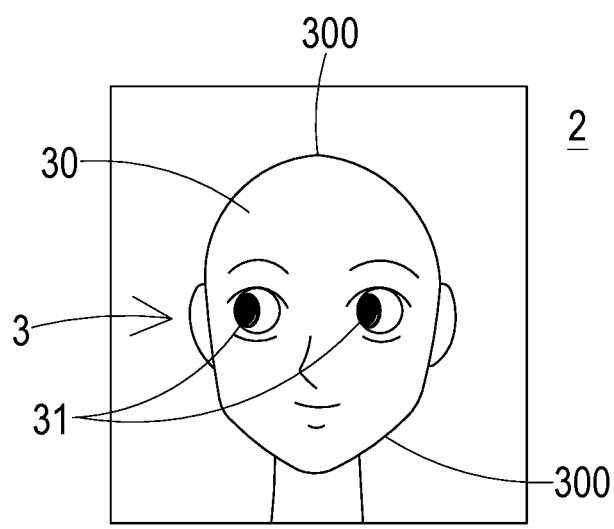
FIG. 4B schematically illustrates the detected image after a movement of the eyeball of the user shown in FIG. 4A.

Please refer to FIG. 3, FIG. 4A, FIG. 4B and FIG. 1. FIG. 3 schematically illustrates the detailed flow chart of a gaze detection, identification and control method according to an embodiment of the present invention. FIG. 4A schematically illustrates the initial image captured through the gaze detection, identification and control method of the present invention. FIG. 4B schematically illustrates the detected image after a movement of the eyeball of the user shown in FIG. 4A. As shown in FIG. 1, FIG. 3, FIG. 4A and FIG. 4B, the step S300 of the gaze detection, identification and control method of the present invention includes sub-steps as following. As shown in sub-step S325, judging an edge position of a head 30 of the user 3 according to the initial image 2. Next, as shown in sub-step S350, defining a head shape 300 of the head 30 of the user 3. Then, as shown in sub-step S375, calculating a relative position of eyeballs 31 of the user 3 in the head shape 300 and a distance between the eyeballs 31 and the edge position according to the initial image 2 to define the gaze position.

For example, in a situation only the eyeballs 31 of the user 3 are moved but not accompanying the head swing (i.e. the eyeballs 31 are moved from the position shown in FIG. 0.4A to the position shown in FIG. 4B), the gaze position and the change of the gaze position are defined according to the information, such like the change of the relative position and move direction of the eyeballs 31 of the user 3 in the head shape 300. Since it is a manner of comparing the relative positions of the eyeballs 31 in the head shape 300, the corrections with high precision are not required while utilizing the gaze detection, identification and control method of the present invention. For different users, the gaze detection, identification and control method of the present invention are directly applied, and the easy recognition is implemented. On the other hand, in a situation the head 30 and the eyeballs 31 of the user 3 both are moved, the gaze detection, identification and control method of the present invention is preferred to calculate the distance between the eyeballs 31 and the edge position of the head shape 300. After a movement, the relative positions of the eyeballs 31 and the head shape 300 will be distinct from the initial image, so that the gaze position of the user may be judged through this manner.

Figure 5:
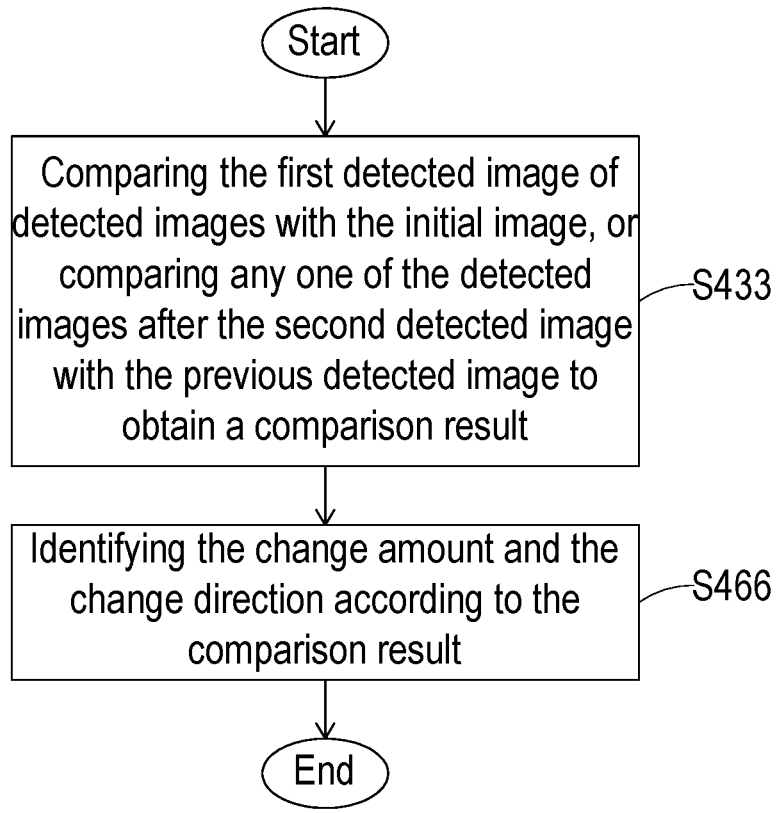
FIG. 5 schematically illustrates the detailed flow chart of a gaze detection, identification and control method according to an embodiment of the present invention.
Figure 6:
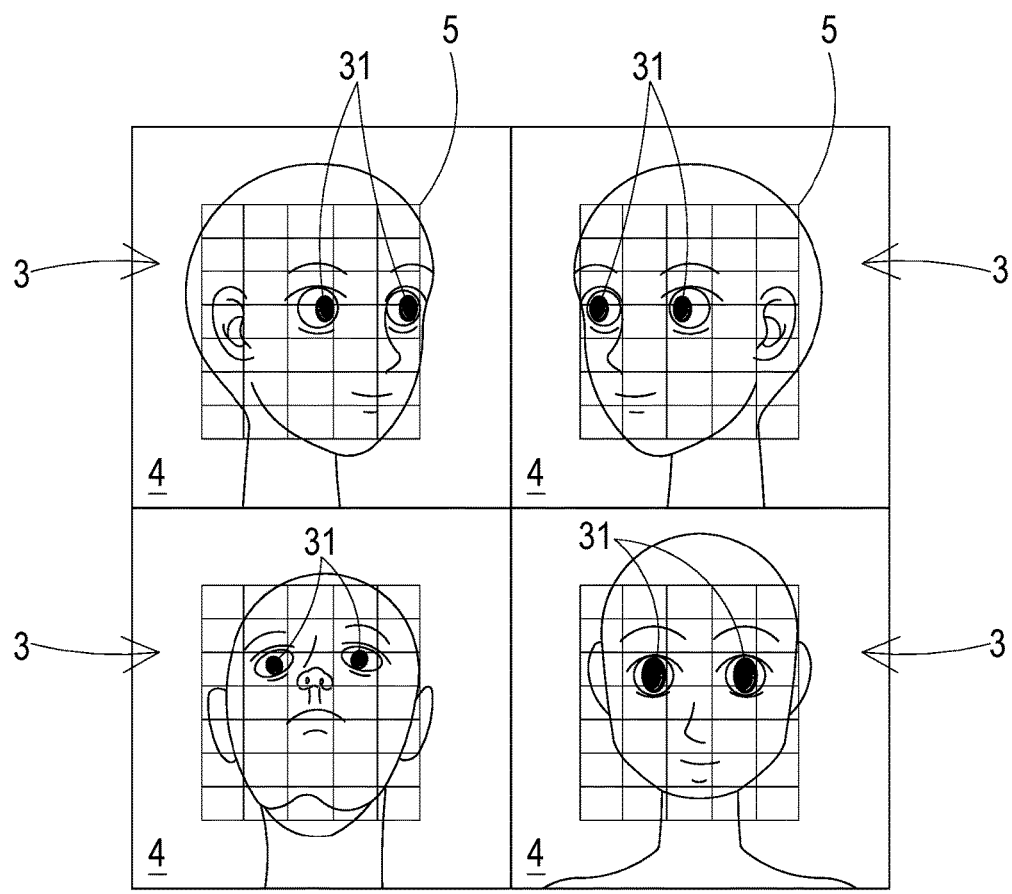
FIG. 6 schematically illustrates the detected images captured through the gaze detection, identification and control method of the present invention.

Please refer to FIG. 5, FIG. 6, FIG. 1 and FIG. 4. FIG. 5 schematically illustrates the detailed flow chart of a gaze detection, identification and control method according to an embodiment of the present invention. FIG. 6 schematically illustrates the detected images captured through the gaze detection, identification and control method of the present invention. As shown in FIG. 1, FIG. 4, FIG. 5 and FIG. 6, the step S400 of the gaze detection, identification and control method of the present invention includes sub-steps as following. As shown in sub-step S433, comparing the first detected image 4 (in a time sequence) of detected images 4 with the initial image 2, or comparing any one of the detected images 4 after the second detected image 4 (in the time sequence) with the previous detected image 4 to obtain a comparison result. In some embodiments, in the sub-step S433, the distances between the edge position and the top, bottom, left, right, far and near of the eyeballs 31 of the user 3 are compared, but not limited herein. In some embodiments, the sub-step S433 is performed by applying a grid coordinate system 5 on the compared detected image 4 and initial image 2, or the compared two continuous detected images 4, and comparing the differences between coordinate positions of the eyeballs 31 of the user 3 in the grid coordinate system 5. Next, as shown in sub-step S466, identifying the change amount and the change direction according to the comparison result. In other words, the amount of the movement of the eyeballs 31 of the user 3 in the grid coordinate system 5 is the change amount. Furthermore, when the action or the gaze of the user 3 has a change amount and a change direction compared with the previous time, the change amount and the change direction may be detected and identified so as to control the portable electronic device through the gaze detection, identification and control method of the present invention.

Figure 7:
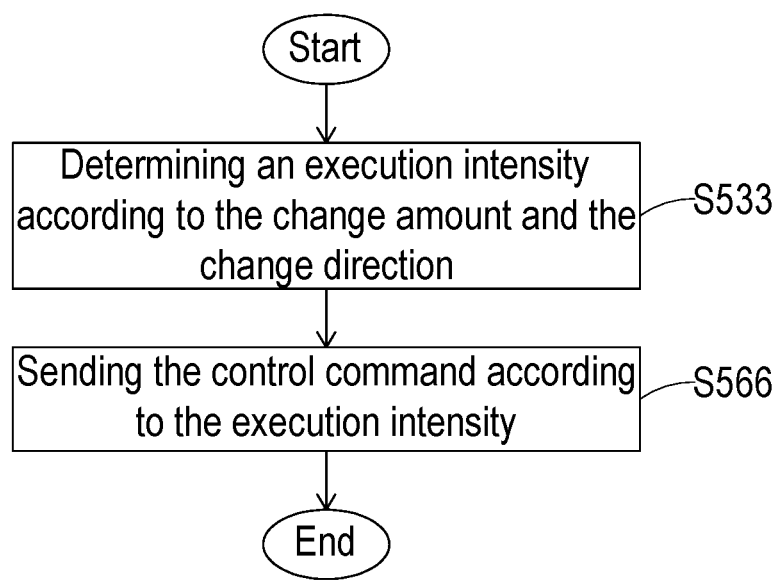
FIG. 7 schematically illustrates the detailed flow chart of a gaze detection, identification and control method according to an embodiment of the present invention.

Please refer to FIG. 7 and FIG. 1. FIG. 7 schematically illustrates the detailed flow chart of a gaze detection, identification and control method according to an embodiment of the present invention. As shown in FIG. 1 and FIG. 7, the step S500 of the gaze detection, identification and control method of the present invention includes sub-steps as following. Firstly, as shown in sub-step S533, determining an execution intensity according to the change amount and the change direction. Next, as shown in sub-step S566, sending the control command according to the execution intensity. In other words, when the change amount of the gaze position towards the specified change direction is relatively larger, it represents that the user wants to send a control command with larger execution intensity (e.g. quickly scrolling the screen or quickly increasing the volume). In some embodiments, it can be set that only when the change amount or the execution intensity exceeds a threshold, the control command is sent to the main processor to execute an application or start a specific function. Otherwise, when the change amount or the execution intensity does not exceed the threshold, it does not proceed any action, but not limited herein.

The preferred embodiments of the gaze detection, identification and control method of the present invention have been completely disclosed. By means of the above-mentioned embodiments, the present invention provides the user a control manner of the portable electronic device with the gaze position, thereby replacing the touch control or cooperating with the touch control. On the other hand, the gaze detection, identification and control method and the portable electronic device using the same of the present invention can be used to perform the following operations, but not limited thereto.

Due to the configuration of the image capture unit and the secondary image capture unit, the present invention can be configured to preview, photograph or browse the photos by using dual cameras. With the gaze direction of eyeballs, the focused object on the eyeball is clear and the range outside the focused object in the photo is taken as background. Furthermore, when taking pictures, the image capture unit can also be utilized to zoom in or zoom out of the focused object through the change of the gaze position. Instead of using two fingers to zoom in or zoom out, the zooming can also be performed by changing the gaze position while browsing photos after photographing. When browsing a 360-degree panoramic photo, the sliding of the photo for viewing different parts of the photo can be performed by changing the gaze position.

Moreover, when reading and surfing mails, articles or webpages, the display, which is being read or surfed, can be stopped or scrolled according to the change of the gaze position. When the smartphone is ringing, the incoming call can be answered or declined according to the change of the gaze position. When playing music, the previous song, the next song, the volume increment and the volume decrement can be performed according to the change of the gaze position. The present invention can even further detect and recognize the blink of the eyes with a variety of ways to complete more operations, but not limited herein.

Figure 8:
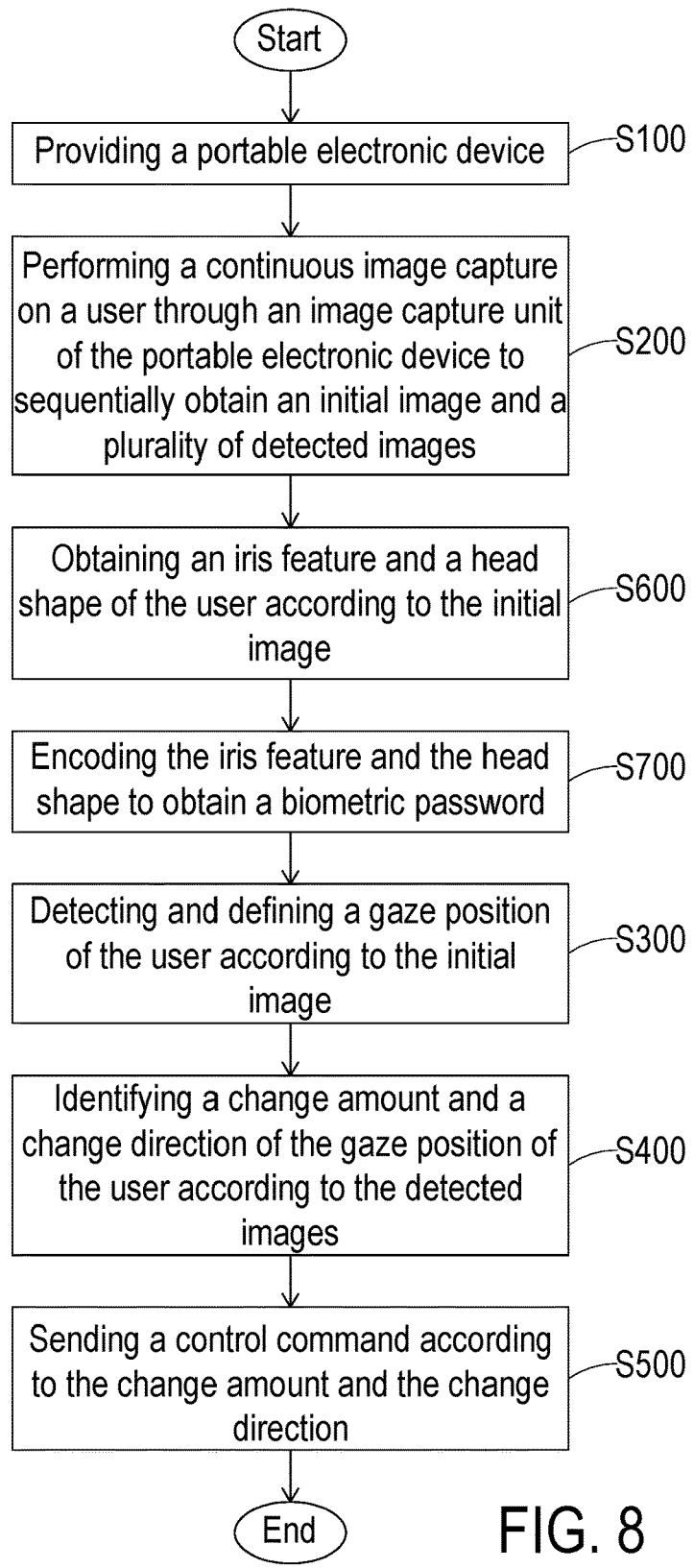
FIG. 8 schematically illustrates the flow chart of a gaze detection, identification and control method according to another embodiment of the present invention.

Please refer to FIG. 8. FIG. 8 schematically illustrates the flow chart of a gaze detection, identification and control method according to another embodiment of the present invention. As shown in FIG. 8, compared with the gaze detection, identification and control method shown in FIG. 1, a gaze detection, identification and control method according to another embodiment of the present invention further includes step S600 and step S700. At first, as shown in step S600, obtaining an iris feature and a head shape of the user according to the initial image. Next, as shown in step S700, encoding the iris feature and the head shape to obtain a biometric password, and further using the biometric password as the unlock manner or the safe certification manner. Since the step S100, the step S200, the step S300, the step S400 and the step S500 are same as the step S100, the step S200, the step S300, the step S400 and the step S500 of the embodiment shown in FIG. 1, they are not redundantly described herein. The step S600 and the step S700 can be performed between the step S200 and the step S300 as shown in FIG. 8, but not limited herein. Certainly, the step S600 and the step S700 can be performed after the initial image is obtained in the step S200. The same advantages will also be achieved, and the sequence of execution is not limited.

From the above description, the present invention provides a gaze detection, identification and control method. By continuously detecting and identifying the gazing position of the user for sending the control command, the gaze control method of controlling the portable electronic device is effectively provided. Meanwhile, since the identification of the change amount and the change direction of the gaze position of different users may be implemented without corrections of high precision, the advantages of easy recognition and time-saving are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A gaze detection, identification and control method, comprising steps of:
   (a) providing a portable electronic device;
   (b) performing a continuous image capture on a user through an image capture unit of the portable electronic device to sequentially obtain an initial image and a plurality of detected images;
   (c) detecting and defining a gaze position of the user according to the initial image;
   (d) identifying a change amount and a change direction of the gaze position of the user according to the detected images;
   (e) sending a control command according to the change amount and the change direction;
   (f) obtaining an iris feature and a head shape of the user according to the initial image; and (g) encoding the iris feature and the head shape to obtain a biometric password.

2. The gaze detection, identification and control method according to claim 1, wherein the step (e) comprises sub-steps of:
 (e1) determining an execution intensity according to the change amount and the change direction; and
 (e2) sending the control command according to the execution intensity.

3. The gaze detection, identification and control method according to claim 1, wherein the step (d) comprises sub-steps of:
 (d1) comparing the first detected image of detected images with the initial image, or comparing any one of the detected images after the second detected image with the previous detected image to obtain a comparison result; and
 (d2) identifying the change amount and the change direction according to the comparison result.

4. The gaze detection, identification and control method according to claim 3, wherein in the sub-step (d1), the distances between the edge position and the top, bottom, left, right, far and near of the eyeballs of the user are compared.

5. The gaze detection, identification and control method according to claim 3, wherein the sub-step (d1) is performed by applying a grid coordinate system on the compared detected image and initial image, or the compared two continuous detected images, and comparing the differences between coordinate positions of the eyeballs of the user in the grid coordinate system.

* * * * *